US012559095B2

(12) United States Patent
Kato et al.

(10) Patent No.: US 12,559,095 B2
(45) Date of Patent: Feb. 24, 2026

(54) VEHICLE CONTROL DEVICE

(71) Applicant: HITACHI ASTEMO, LTD., Hitachinaka (JP)

(72) Inventors: Hiroki Kato, Tokyo (JP); Satoshi Kashiwamura, Tokyo (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 196 days.

(21) Appl. No.: 18/555,803

(22) PCT Filed: Mar. 9, 2022

(86) PCT No.: PCT/JP2022/010224
§ 371 (c)(1),
(2) Date: Oct. 17, 2023

(87) PCT Pub. No.: WO2023/037601
PCT Pub. Date: Mar. 16, 2023

(65) Prior Publication Data
US 2024/0208491 A1 Jun. 27, 2024

(30) Foreign Application Priority Data

Sep. 13, 2021 (JP) ................................. 2021-148429

(51) Int. Cl.
*B60W 30/09* (2012.01)
*B60W 30/095* (2012.01)
*B60W 50/00* (2006.01)
(52) U.S. Cl.
CPC ........ *B60W 30/09* (2013.01); *B60W 30/0956* (2013.01); *B60W 50/0097* (2013.01);
(Continued)

(58) Field of Classification Search
CPC ............. B60W 30/09; B60W 30/0956; B60W 50/0097; B60W 2050/0022;
(Continued)

(56) References Cited

U.S. PATENT DOCUMENTS

2018/0178784 A1* 6/2018 Ohta ......................... B60T 8/00
2019/0005821 A1* 1/2019 Matsunaga ........... G01S 13/931
(Continued)

FOREIGN PATENT DOCUMENTS

JP 2006-298099 A 11/2006
JP 2017-202725 A 11/2017
(Continued)

OTHER PUBLICATIONS

International Search Report with English Translation and Written Opinion of International Patent Application No. PCT/JP2022/010224 dated May 31, 2022 (9 pages).

*Primary Examiner* — Jason Holloway
(74) *Attorney, Agent, or Firm* — Foley & Lardner LLP

(57) ABSTRACT

The present disclosure provides a vehicle control device capable of preventing an erroneous operation of an advanced driving assistance system while ensuring safety. A vehicle control device 110 includes a course prediction unit F1, a collision prediction unit F3, a vehicle control unit F5, and a control intervention adjustment unit F4. The course prediction unit F1 predicts a turning course of a vehicle as a steady circular turning course based on a steering angle θ. The collision prediction unit F3 calculates a collision margin time (TTC) between a target detected by an external environment sensor of the vehicle and the vehicle that travels on the steady circular turning course, and calculates a predicted collision lateral position CLL of the target with respect to a vehicle width center position of the vehicle. The vehicle control unit F5 performs collision avoidance control of a vehicle 100 when the collision margin time is shorter than a (Continued)

control intervention threshold value TH. The control intervention adjustment unit F4 adjusts the control intervention threshold value TH. The control intervention adjustment unit F4 reduces the control intervention threshold value when the predicted collision lateral position CLL with respect to the vehicle width center position of the vehicle is in a direction opposite to a direction of a steering angular speed which is a time change rate of the steering angle θ.

7 Claims, 13 Drawing Sheets

(52) U.S. Cl.
CPC . *B60W 2050/0022* (2013.01); *B60W 2520/06* (2013.01); *B60W 2520/14* (2013.01); *B60W 2540/18* (2013.01); *B60W 2554/4041* (2020.02)

(58) Field of Classification Search
CPC ......... B60W 2520/06; B60W 2520/14; B60W 2540/18; B60W 2554/4041; B60W 30/045; B60W 2520/10; B62D 15/0265; B62D 6/002; G06V 20/58; G08G 1/166
See application file for complete search history.

(56) References Cited

U.S. PATENT DOCUMENTS

| | | | | |
|---|---|---|---|---|
| 2022/0266823 A1* | 8/2022 | Arima | .................... | B60W 10/20 |
| 2022/0289174 A1* | 9/2022 | Hashimoto | ....... | B60W 60/0015 |

FOREIGN PATENT DOCUMENTS

| | | |
|---|---|---|
| JP | 2018-103703 A | 7/2018 |
| JP | 2018-162007 A | 10/2018 |
| JP | 2020-100230 A | 7/2020 |

* cited by examiner

VEHICLE CONTROL DEVICE

TECHNICAL FIELD

The present disclosure relates to a vehicle control device.

BACKGROUND ART

Conventionally, there has been known a driving assistance device that calculates a course of a host vehicle and determines whether or not the course of the host vehicle collides with an object around the host vehicle. A driving assistance device disclosed in PTL 1 calculates a host vehicle course based on a yaw rate of the host vehicle, and executes a driving assistance process of avoiding or alleviating a collision with an object based on a possibility of the collision with the object in a target region including the host vehicle course (Abstract, claim 1, and paragraph [0007]).

The conventional driving assistance device includes a reliability calculation unit and a restriction unit. The reliability calculation unit calculates the reliability indicating the certainty of the host vehicle course based on a steering parameter including at least one of a yaw rate change rate which is a time change rate of the yaw rate and a steering speed. The restriction unit restricts execution of the driving assistance process based on the reliability. According to the conventional driving assistance device, since the driving assistance process is restricted in accordance with the certainty of the host vehicle course, it is possible to suppress an unnecessary operation of the driving assistance process (PTL 1, paragraph [0008]).

CITATION LIST

Patent Literature

PTL 1: JP 2020-100230 A

SUMMARY OF INVENTION

Technical Problem

As described above, the driving assistance device (ECU) disclosed in PTL 1 restricts an operation of pre-crash safety (PCS) control in accordance with the calculated reliability. More specifically, as the operation restriction of the PCS control, the ECU reduces an operation area which is a position condition of an object for operating each device of an alarm device, a brake device, and a seat belt device (PTL 1, paragraph [0039], FIGS. 1 and 5(a)).

As described above, when the operation area is equally reduced to the left and right, the operation area is reduced even in a direction in which the traveling direction of a vehicle changes. Thus, an object having a risk of colliding with the host vehicle may be excluded from the operation area, the PCS control may not operate, and the safety may be lowered.

In addition, the conventional assistance device increases the reliability indicating the certainty of the host vehicle course in accordance with the lapse of time in a period in which the turning state of the host vehicle does not change (PTL 1, paragraph [0032]). In this case, for example, in the middle of turning right or left of the host vehicle, regardless of the high reliability of the host vehicle course, the calculated host vehicle course may deviate from the actual travel route of the host vehicle even though the reliability of the host vehicle course is high, and the PCS control may be performed erroneously.

The present disclosure provides a vehicle control device capable of preventing an erroneous operation of an advanced driving assistance system while ensuring safety.

Solution to Problem

According to an aspect of the present disclosure, there is provided a vehicle control device mounted on a vehicle. The vehicle control device includes a course prediction unit that predicts a turning course when the vehicle turns left or right, as a steady circular turning course, based on a steering angle detected by a steering angle sensor of the vehicle, a collision prediction unit that calculates a collision margin time between a target detected by an external environment sensor of the vehicle and the vehicle that travels on the steady circular turning course, and calculates a predicted collision lateral position of the target with respect to a vehicle width center position of the vehicle, a vehicle control unit that performs collision avoidance control of the vehicle when the collision margin time is shorter than a control intervention threshold value, and a control intervention adjustment unit that adjusts the control intervention threshold value. The control intervention adjustment unit reduces the control intervention threshold value when the predicted collision lateral position with respect to the vehicle width center position of the vehicle is in a direction opposite to a direction of a steering angular speed which is a time change rate of the steering angle.

Advantageous Effects of Invention

According to the aspect of the present disclosure, it is possible to provide a vehicle control device capable of preventing an erroneous operation of an advanced driving assistance system while ensuring safety.

BRIEF DESCRIPTION OF DRAWINGS

FIG. 2 is a functional block diagram of the vehicle control device illustrated in FIG. 1.

DESCRIPTION OF EMBODIMENTS

Figure 1:
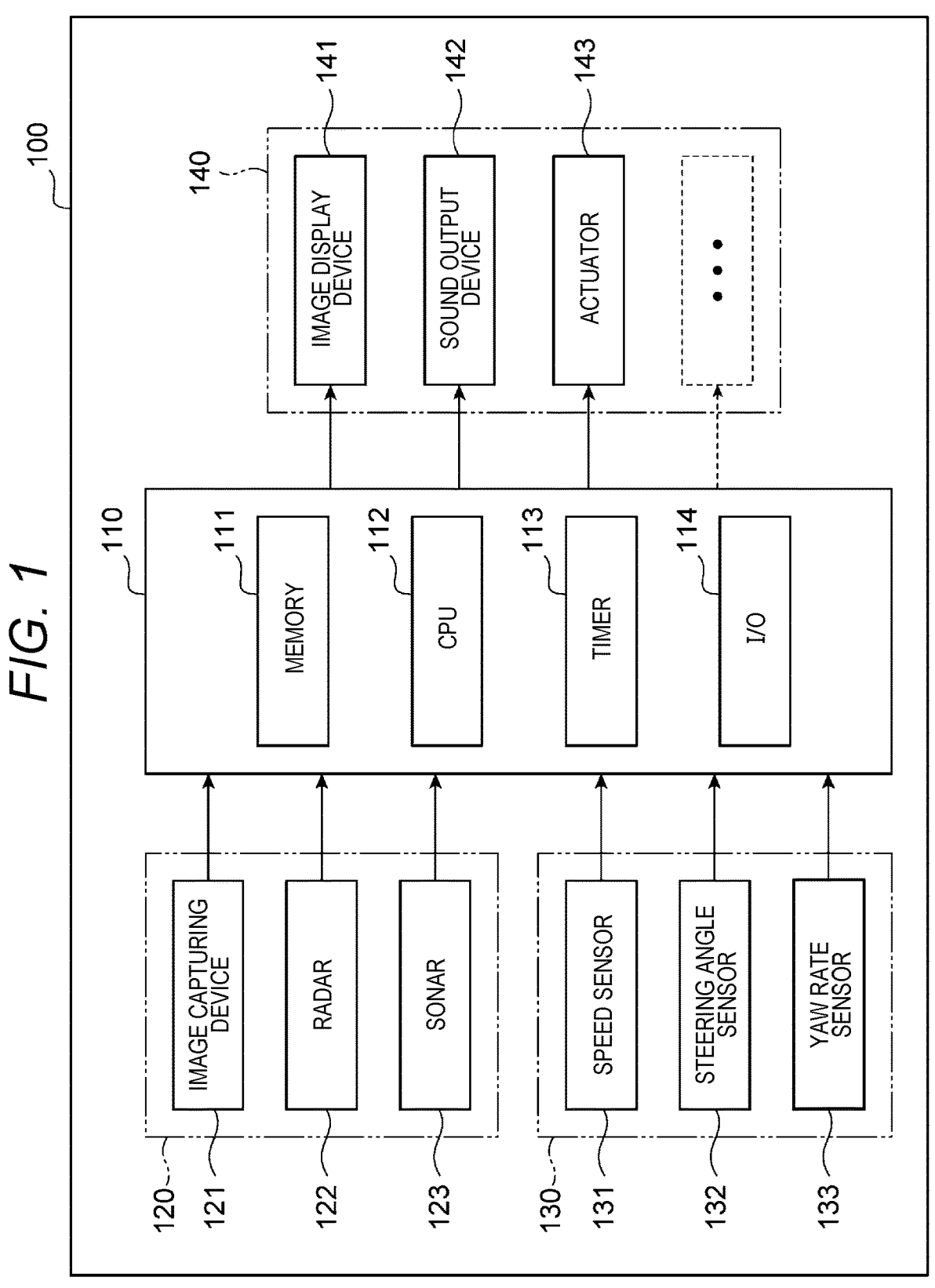
FIG. 1 is a schematic configuration diagram of a vehicle illustrating an embodiment of a vehicle control device according to the present disclosure.

Hereinafter, an embodiment of a vehicle control device according to the present disclosure will be described with reference to the drawings. FIG. 1 is a schematic configuration diagram of a vehicle 100 illustrating an embodiment of a vehicle control device according to the present disclosure.

A vehicle control device 110 in the present embodiment is, for example, an electronic control device (ECU) mounted on the vehicle 100 equipped with an advanced driver assistance system (ADAS). The vehicle control device 110 includes, for example, a memory 111 such as a ROM and a RAM, a central processing unit (CPU) 112, a timer 113, an input/output unit 114, and the like. The vehicle control device 110 can be configured by one or more microcontrollers.

In addition to the vehicle control device 110, the vehicle 100 includes, for example, an external environment sensor 120, a vehicle sensor 130, and a control target 140. Each unit of the vehicle 100 constitutes the ADAS of the vehicle 100. The ADAS of the vehicle 100 implements various driving support functions, for example, adaptive cruise control (ACC), forward collision warning (FCW), collision avoidance braking (AEB), and the like.

For example, the external environment sensor 120 detects an object around the vehicle 100 and outputs information on the detected object to the vehicle control device 110. The object detected by the external environment sensor 120 includes, for example, a road, a vehicle, a pedestrian, a road mark, a road sign, a traffic light, a curbstone, a building, an obstacle, and the like. The external environment sensor 120 includes, for example, an image capturing device 121, a radar 122, and a sonar 123. The image capturing device 121 includes, for example, a stereo camera or a monocular camera. The radar 122 includes, for example, a laser radar or a millimeter wave radar.

For example, the vehicle sensor 130 detects a physical quantity related to the vehicle 100 and outputs information on the detected physical quantity to the vehicle control device 110. The physical quantity detected by the vehicle sensor 130 includes, for example, a speed, an acceleration, a yaw rate, a steering angle, and the like of the vehicle 100. The vehicle sensor 130 includes, for example, a speed sensor 131 such as a wheel speed sensor, a steering angle sensor 132, and a yaw rate sensor 133.

The control target 140 is, for example, various devices controlled by a control signal output from the vehicle control device 110. The control target 140 includes an image display device 141, a sound output device 142, and an actuator 143. The control target 140 may further include an engine, a motor, a transmission, and the like mounted on the vehicle 100.

The image display device 141 includes, for example, a head-up display, a liquid crystal display device, an organic EL display device, and the like. The sound output device 142 includes, for example, a speaker and a buzzer. The actuator

143 includes, for example, an accelerator actuator, a brake actuator, a steering actuator, and a gearbox actuator.

Figure 2:
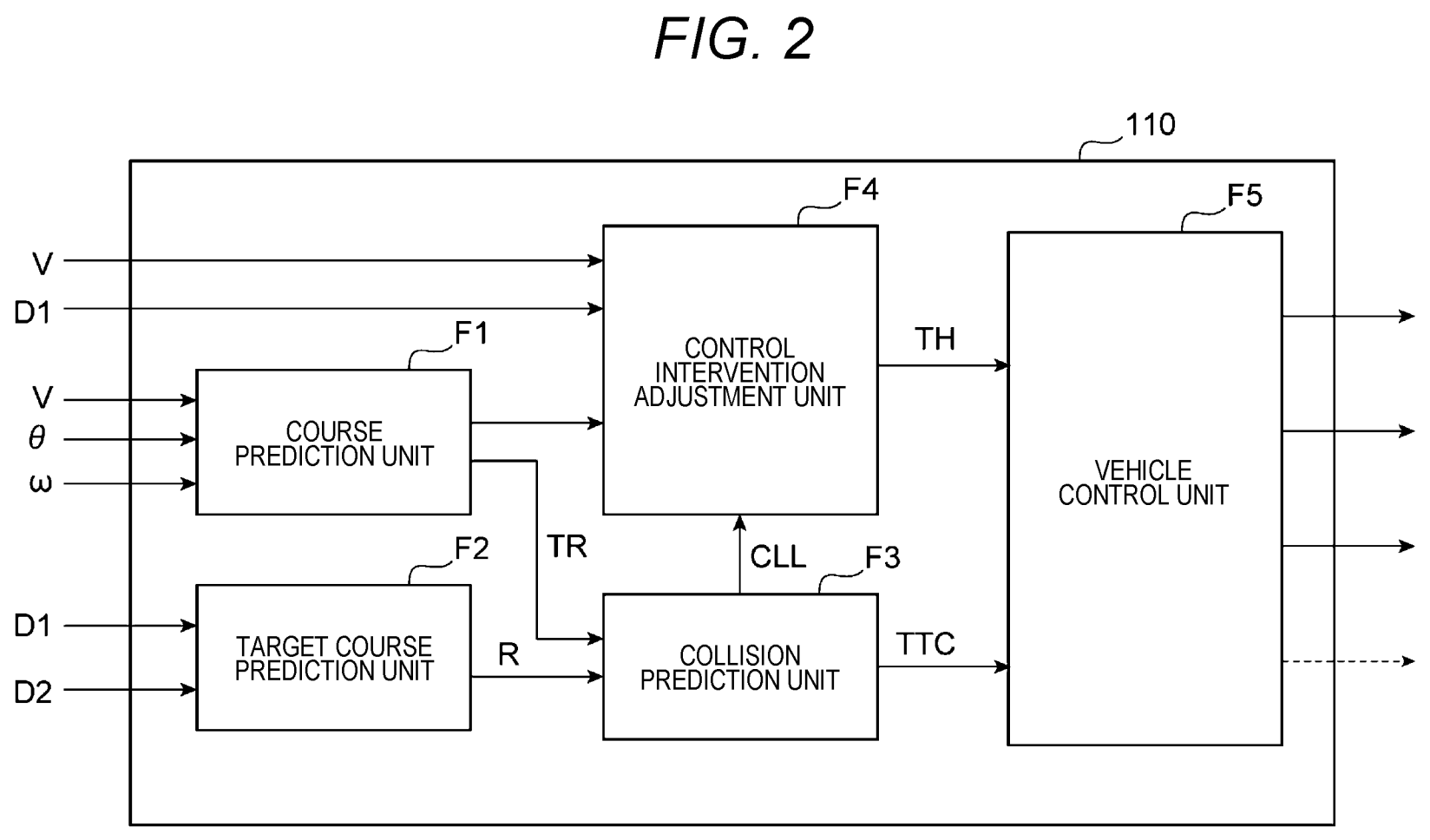

FIG. 2 is a functional block diagram of the vehicle control device 110 illustrated in FIG. 1. The vehicle control device 110 includes a course prediction unit F1, a collision prediction unit F3, a control intervention adjustment unit F4, and a vehicle control unit F5. Further, in the example illustrated in FIG. 2, the vehicle control device 110 includes a target course prediction unit F2. Each unit of the vehicle control device 110 illustrated in FIG. 2 represents a function of the vehicle control device 110 implemented in a manner that the CPU 112 executes a program stored in the memory 111 of the vehicle control device 110 illustrated in FIG. 1.

Figure 3:
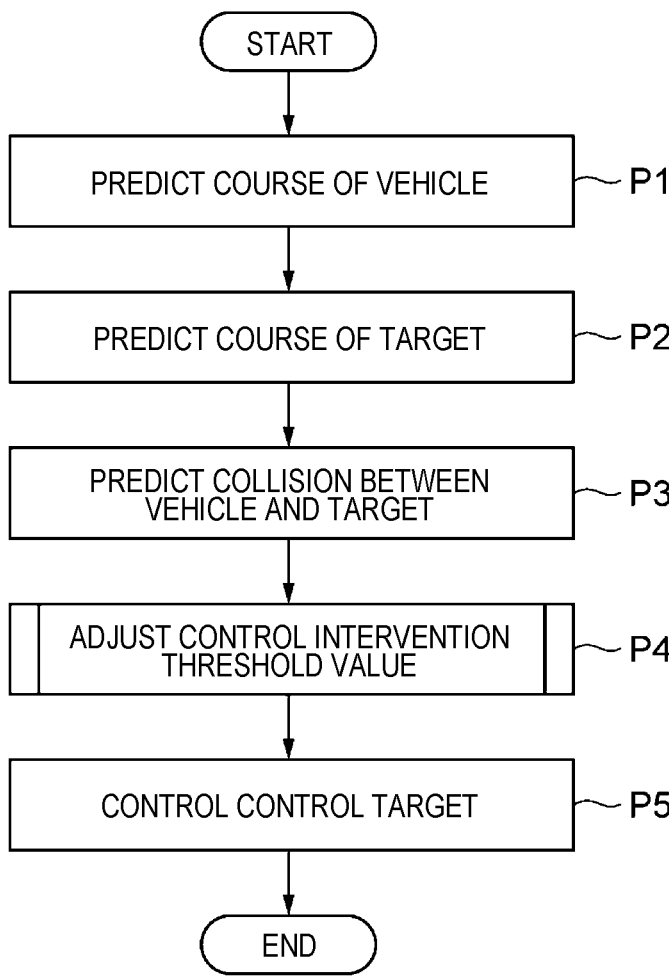
FIG. 3 is a flowchart illustrating an operation of the vehicle control device in FIGS. 1 and 2.
Figure 4:
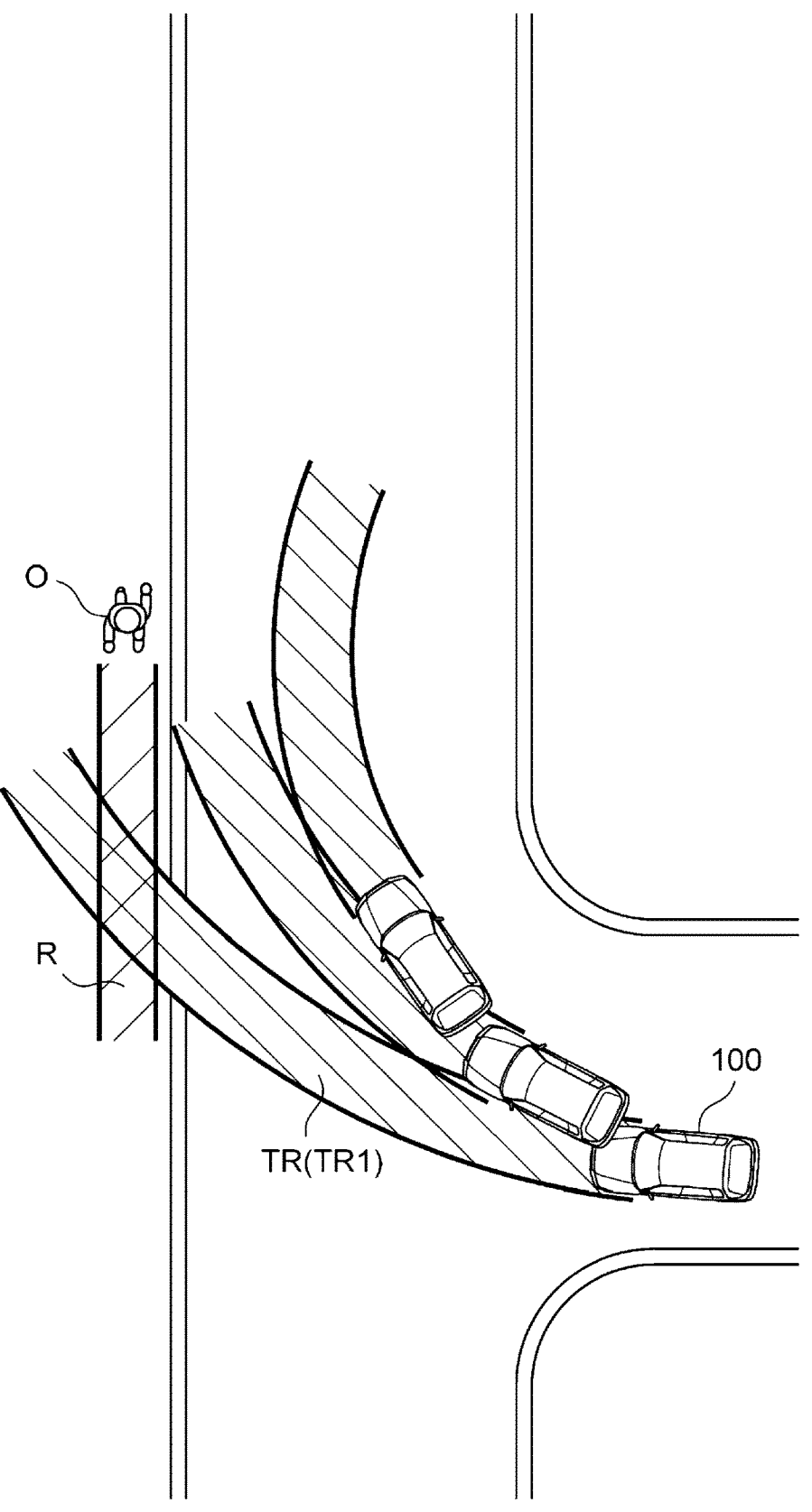
FIG. 4 is a plan view when the vehicle in FIG. 1 starts turning right at an intersection.

FIG. 3 is a flowchart illustrating an operation of the vehicle control device 110 in FIGS. 1 and 2. FIG. 4 is a plan view when the vehicle 100 traveling on a left-hand traffic road starts turning right on a T-shaped road. An operation of the vehicle control device 110 when the vehicle 100 turns right at an intersection of the left-hand traffic road will be described below.

Note that an operation of the vehicle control device 110 when the vehicle 100 turns left is similar to the operation of the vehicle control device 110 when the vehicle 100 turns right, except that the left and right are reversed. Thus, the description thereof will be omitted. In addition, an operation of the vehicle control device 110 when the vehicle 100 travels on a right-hand traffic road is basically similar to that when the vehicle 100 travels on a left-hand traffic road. Thus, the description thereof will be omitted.

For example, the vehicle control device 110 repeatedly executes the processing flow illustrated in FIG. 3 in a predetermined period while the vehicle 100 is traveling. While the vehicle 100 is traveling, vehicle information including a speed V, a steering angle θ, and a yaw rate ω of the vehicle 100 detected by the vehicle sensor 130 is input to the course prediction unit F1 of the vehicle control device 110 illustrated in FIG. 2. When starting the processing illustrated in FIG. 3, the vehicle control device 110 first executes a process P1 of predicting the course of the vehicle 100.

As illustrated in FIG. 4, when the vehicle 100 is turning right at an intersection of a left-hand traffic road, the course prediction unit F1 predicts a turning course TR when the vehicle 100 turns right, as a steady circular turning course based on the steering angle θ detected by the steering angle sensor 132 of the vehicle 100. Here, the steady circular turning course is, for example, an arc-shaped predicted course of the vehicle 100 when conditions such as the speed V and the steering angle θ of the vehicle 100 are constant. The turning course TR of the vehicle 100 predicted by the course prediction unit F1 is, for example, an arc-shaped region having a width equal to the vehicle width of the vehicle 100.

As illustrated in FIG. 4, for a while after the vehicle 100 starts turning right, a driver of the vehicle 100 steers more, and thus the steering angle θ increases. Therefore, as illustrated in FIG. 4, every time the vehicle control device 110 repeats a control period, the radius of the turning course TR as the steady circular turning course predicted by the course prediction unit F1 in the process P1 decreases. When the prediction process P1 of the turning course TR of the vehicle 100 by the course prediction unit F1 is ended, the vehicle control device 110 executes a process P2 of predicting the course of the target.

In the process P2, for example, the vehicle control device 110 predicts a course R of a target O by the target course prediction unit F2 as illustrated in FIG. 4. Specifically, the target course prediction unit F2 acquires, for example, information D1 on an object in front of the vehicle 100, which is detected by the image capturing device 121, and information D2 on an object in front of the vehicle 100, which is detected by the radar 122. The target course prediction unit F2 recognizes, for example, an object such as a pedestrian as the target O based on the pieces of information D1 and D2.

Further, the target course prediction unit F2 predicts the course R of the target O, for example, based on information such as a distance, a direction, a relative speed, and a type of the target O included in the acquired pieces of information D1 and D2. Here, the course R of the target O predicted by the target course prediction unit F2 is a band-shaped region having the same width as the width of the target O. Note that the vehicle control device 110 may predict the course R of the target O by the collision prediction unit F3. In this case, the target course prediction unit F2 illustrated in FIG. 2 can be omitted.

After the process P2 of predicting the course R of the target O illustrated in FIG. 3 is ended, the vehicle control device 110 executes a process P3 of predicting a collision between the vehicle 100 and the target O. In the process P3, the collision prediction unit F3 of the vehicle control device 110 predicts whether or not a collision between the vehicle 100 and the target O occurs in the future, based on the turning course TR of the vehicle 100 predicted by the course prediction unit F1 and the course R of the target O predicted by the target course prediction unit F2.

More specifically, for example, as illustrated in FIG. 4, when it is predicted that the vehicle 100 and the target O are located at the same time in the future in a region in which the turning course TR of the vehicle 100 overlaps the course R of the target O, the collision prediction unit F3 predicts that the vehicle 100 and the target O collide with each other. For example, when the collision prediction unit F3 predicts that the vehicle 100 and the target O collide with each other, the collision prediction unit F3 calculates a collision margin time (TTC), which is a time until collision, and a predicted collision lateral position CLL of the target O with respect to a vehicle width center position of the vehicle 100.

When the process P3 of predicting the collision between the vehicle 100 and the target O illustrated in FIG. 3 is ended, the vehicle control device 110 executes a process P4 of adjusting a control intervention threshold value of the ADAS. In the process P4, the control intervention adjustment unit F4 of the vehicle control device 110 adjusts the control intervention threshold value TH of the ADAS based on the predicted collision lateral position CLL of the target O with respect to the vehicle width center position of the vehicle 100, which is calculated by the collision prediction unit F3.

Figure 5:
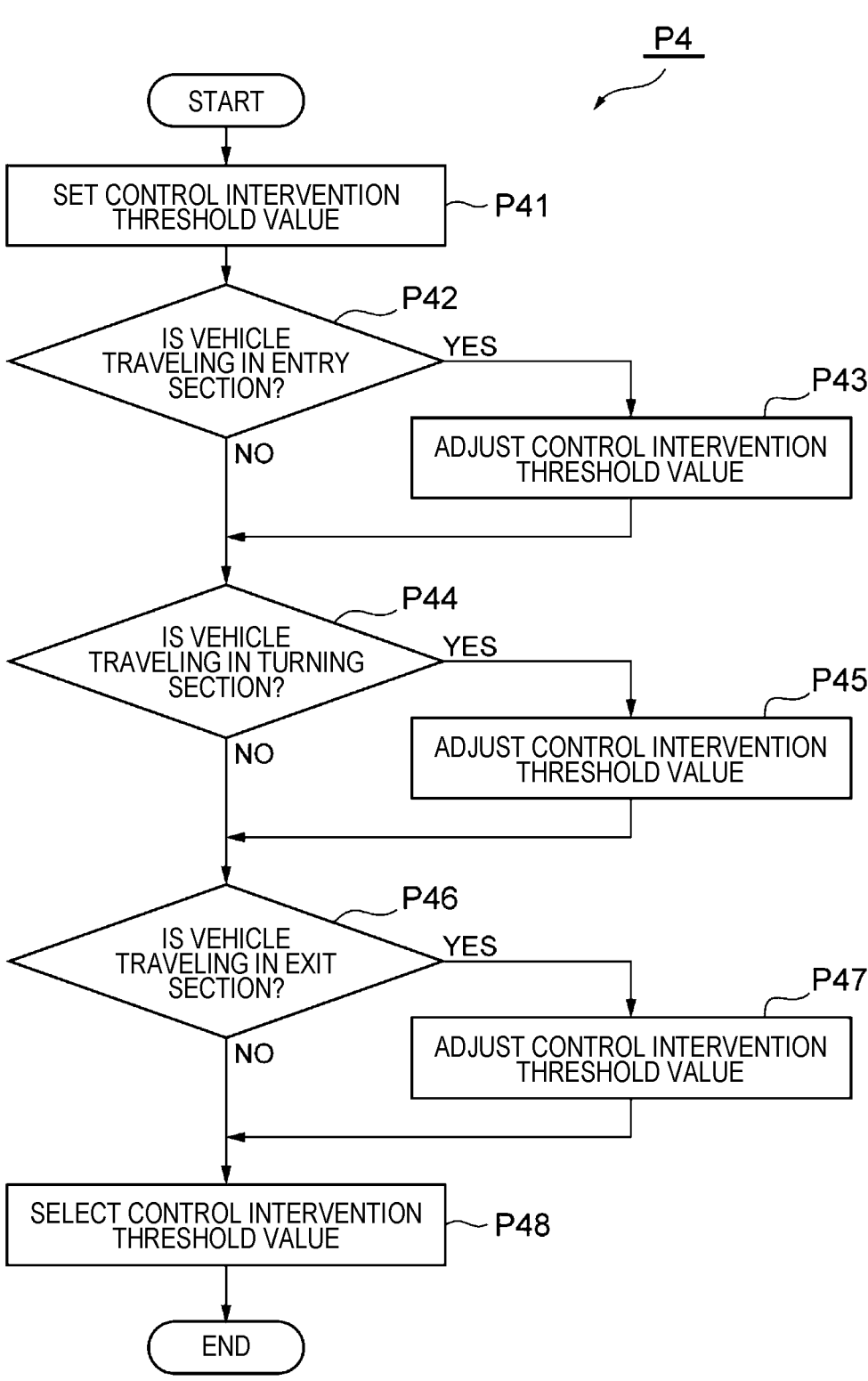
FIG. 5 is a flowchart illustrating details of a process of adjusting a control intervention threshold value in FIG. 3.

FIG. 5 is a flowchart illustrating details of the process P4 of adjusting the control intervention threshold value in FIG. 3. When the process P4 illustrated in FIG. 5 is started, the control intervention adjustment unit F4 of the vehicle control device 110 first executes a process P41 of setting a reference value of the control intervention threshold value TH of the ADAS. A control intervention threshold value T0 set in the process P41 is, for example, a threshold value of the collision margin time calculated in the process P3 described above, and is the reference value of the control intervention threshold value TH for determining whether or not the vehicle control unit F5 performs control of the control target 140 in a process P5 described later illustrated in FIG. 3.

In the process P41, for example, the control intervention adjustment unit F4 sets the control intervention threshold value T0 according to the speed of the vehicle 100. More specifically, for example, a table in which the control intervention threshold value T0 that is a threshold value of the collision margin time is defined to be extended as the speed V of the vehicle 100 increases is recorded in the memory 111 of the vehicle control device 110. Note that the vehicle control device 110 may have a plurality of tables defined for each type and movement state of the target O. In this case, the control intervention adjustment unit F4 sets the control intervention threshold value TO, for example, based on the speed V of the vehicle 100, the information D1 including the type, the speed, and the moving direction of the target O, and the table stored in the memory 111.

Then, the vehicle control device 110 executes a process P42 of determining whether or not the vehicle 100 is traveling in an entry section TR1 of the turning course TR at the time of turning right as illustrated in FIG. 4. Here, the entry section TR1 is, for example, a section at the early stage of the turning course TR, and is a section in which the steering angle θ increases in a manner that the vehicle 100 enters an intersection and the driver turns the steering wheel rightward, which is a turning direction at the time of turning right. In the process P42, for example, when the direction of the steering angular speed, which is the time change rate of the steering angle θ, is the turning direction at the time of turning right, that is, a right direction, the course prediction unit F1 determines that the vehicle 100 is traveling in the entry section TR1 (YES).

In the process P42, for example, when a distance to a traffic light, which is obtained from the external environment sensor 120, is within a predetermined range, the course prediction unit F1 determines that the vehicle 100 is traveling in the entry section TR1 (YES). Further, the course prediction unit F1 may determine whether or not the vehicle 100 is traveling in the entry section TR1, for example, by using high-precision three-dimensional map data (HD map) or a global positioning satellite system (GNSS).

In the process P42, when determining that the vehicle 100 is not traveling in the entry section TR1 (NO), for example, the course prediction unit F1 executes a process P44 (described later) of determining whether or not the vehicle 100 is traveling in the turning section TR2. On the other hand, when the course prediction unit F1 determines in the process P42 that the vehicle 100 is traveling in the entry section TR1 (YES), the vehicle 100 executes a process P43 of adjusting a control intervention threshold value T1 in the entry section TR1.

Figure 6:
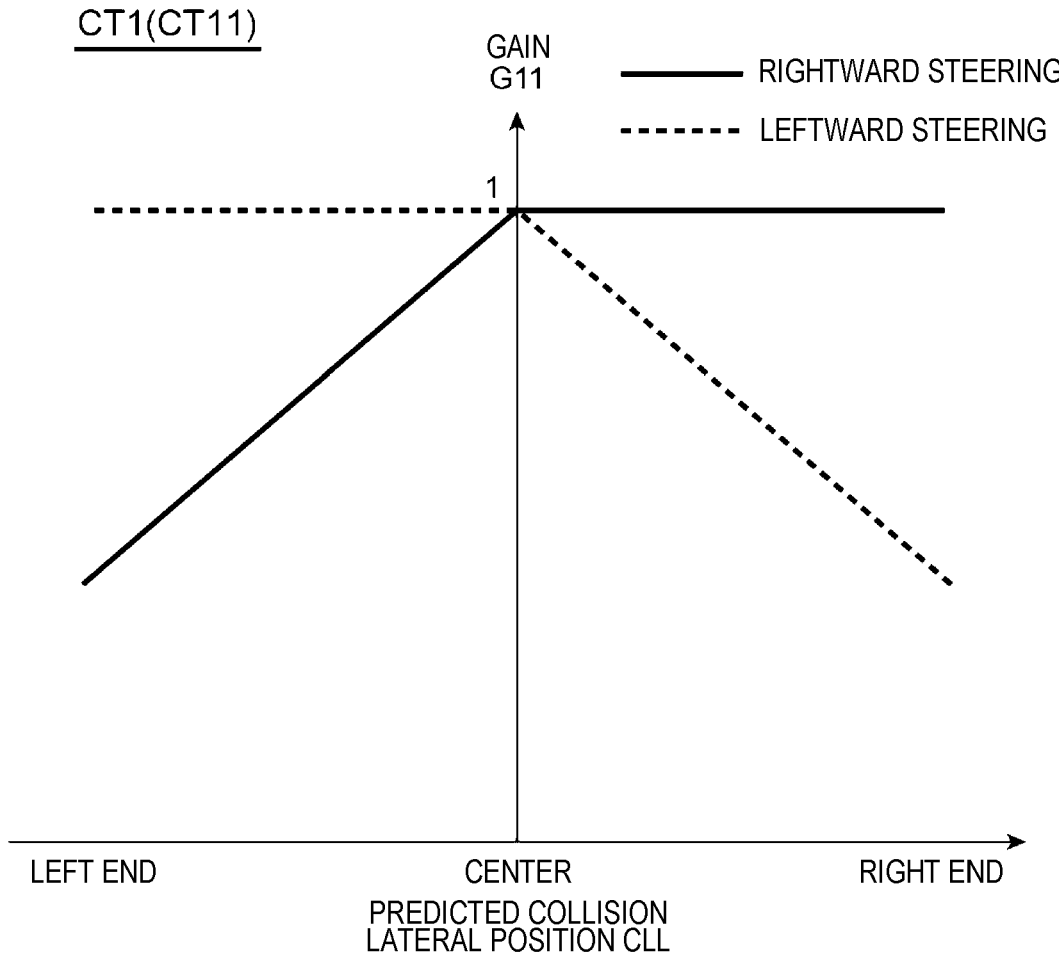
FIG. 6 is an example of a correction table used for adjusting the control intervention threshold value in an entry section in FIG. 5.
Figure 7:
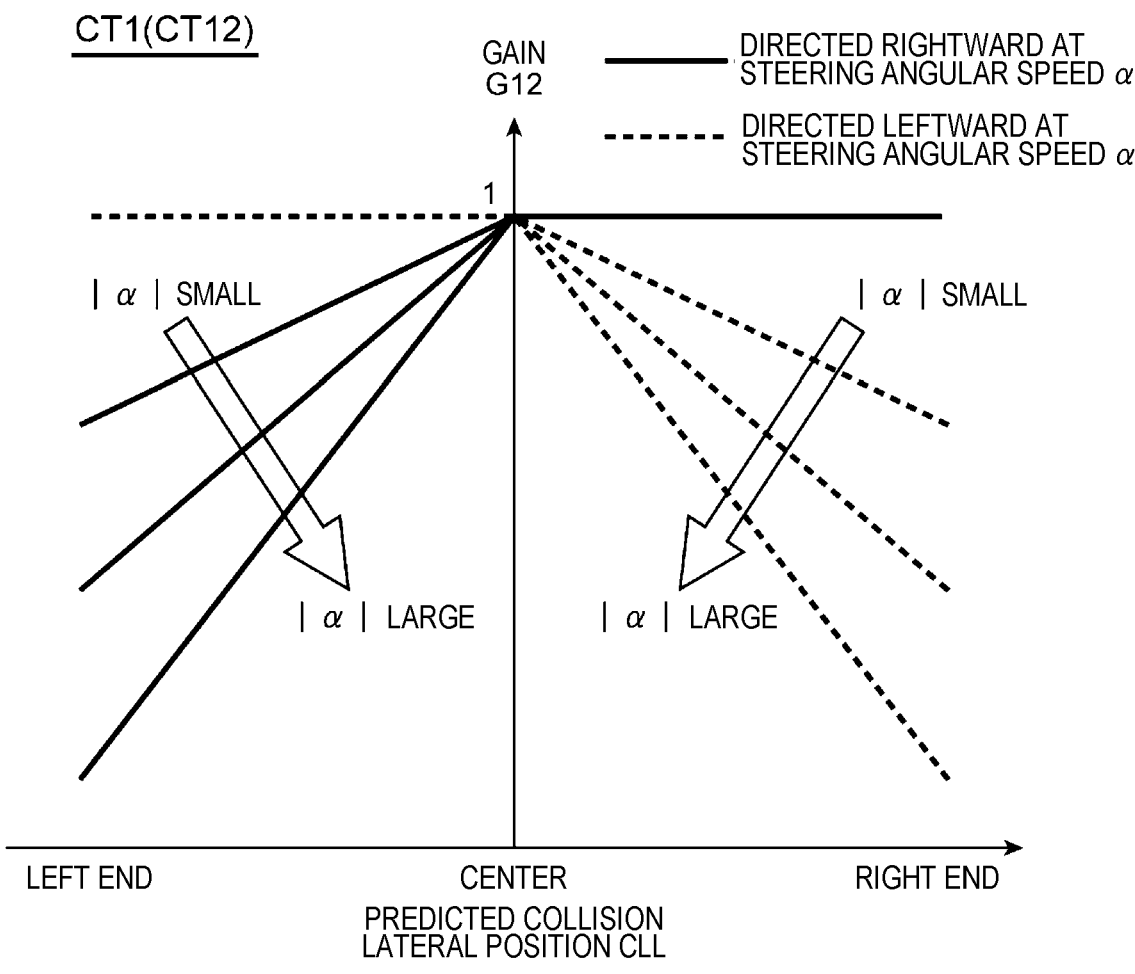
FIG. 7 is another example of the correction table used for adjusting the control intervention threshold value in an entry section in FIG. 5.

FIGS. 6 and 7 are graphs illustrating examples of a correction table CT1 used in the process P43 of adjusting the control intervention threshold value T1 in the entry section TR1. In the present embodiment, the control intervention adjustment unit F4 of the vehicle control device 110 has, for example, the correction table CT1 in which gains G11 and G12 for reducing the control intervention threshold value T1 in the entry section TR1 of the turning course TR are defined. The correction table CT1 is stored in the memory 111 of the vehicle control device 110, for example.

The correction table CT1 of the entry section TR1 includes, for example, a steering direction gain table CT11 illustrated in FIG. 6 and a steering angular speed gain table CT12 illustrated in FIG. 7. Each of the steering direction gain table CT11 and the steering angular speed gain table CT12 is a graph in which the predicted collision lateral position CLL is set on the horizontal axis and the gains G11 and G12 are set on the vertical axis. Here, the predicted collision lateral position CLL is a collision prediction position of the target O with respect to the front end of the vehicle 100, and is a collision prediction position of the target O in the vehicle width direction of the vehicle 100.

In the process P43 illustrated in FIG. 5, the control intervention adjustment unit F4 calculates the control intervention threshold value T1 of the entry section TR1 by the following Expression (1), for example. In Expression (1), G11 and G12 are gains G11 and G12 determined based on the steering direction gain table CT11 in FIG. 6 and the steering angular speed gain table CT12 in FIG. 7, respectively. T0 is a control intervention threshold value T0 set based on the speed V of the vehicle 100 in the above-described process P41.

$$T1 = G11 \times G12 \times T0 \qquad (1)$$

As illustrated in FIG. 6, in the steering direction gain table CT11 of the entry section TR1, the gain is 1 when the predicted collision lateral position CLL is on the same side as the steering direction of the vehicle 100 with respect to the vehicle width center position of the vehicle 100. For example, as indicated by the solid line in FIG. 6, the gain G11 is 1 when the steering direction of the vehicle 100 based on the steering angle θ detected by the steering angle sensor 132 is rightward (rightward steering), and the predicted collision lateral position CLL is at the center of the vehicle 100 in the vehicle width direction or on the right side of the center.

In addition, in the steering direction gain table CT11 of the entry section TR1 illustrated in FIG. 6, the gain G11 decreases as the predicted collision lateral position CLL moves away from the vehicle width center position of the vehicle 100 in a direction opposite to the steering direction of the vehicle 100. For example, as indicated by the solid line in FIG. 6, when the steering direction of the vehicle 100 is the right direction (rightward steering), the gain G11 gradually decreases from 1 to 0 as the predicted collision lateral position CLL moves away from the center of the vehicle width direction of the vehicle 100 in the left direction.

When the gain G11 is smaller than 1, the control intervention threshold value T1 of the entry section TR1, which is the threshold value of the collision margin time for determining the control intervention by the ADAS, is reduced as in the above Expression (1), and the control intervention by the ADAS is suppressed. That is, in the entry section TR1 in the turning course TR, the control intervention adjustment unit F4 reduces the control intervention threshold value T1 of the entry section TR1 as the predicted collision lateral position CLL of the target O moves away from the center in the vehicle width direction of the vehicle 100 in the direction opposite to the steering direction. In this manner, the control intervention adjustment unit F4 suppresses the control intervention by the ADAS.

Further, as illustrated in FIG. 7, in the steering angular speed gain table CT12 of the entry section TR1, the gain G12 is 1 when the predicted collision lateral position CLL is on the same side as the direction of the steering angular speed a with respect to the vehicle width center position of the vehicle 100. For example, as indicated by the solid line in FIG. 7, the gain G12 is 1 when the direction of the steering angular speed a of the vehicle 100 is rightward and the predicted collision lateral position CLL is at the center of the vehicle 100 in the vehicle width direction or on the right side of the center.

In addition, in the steering angular speed gain table CT12 of the entry section TR1 illustrated in FIG. 7, the gain G12 decreases as the predicted collision lateral position CLL moves away from the vehicle width center position of the vehicle 100 in the direction opposite to the direction of the steering angular speed α of the vehicle 100. For example, as indicated by the solid line in FIG. 7, when the steering direction of the steering angular speed a of the vehicle 100 is rightward, the gain G12 gradually decreases from 1 to 0 as the predicted collision lateral position CLL moves away from the center of the vehicle width direction of the vehicle 100 in the left direction.

Furthermore, in the steering angular speed gain table CT12 of the entry section TR1 illustrated in FIG. 7, the change rate of the gain G12 with respect to the predicted collision lateral position CLL increases as the steering angular speed a increases. More specifically, in the steering angular speed gain table CT12, for example, when the rightward steering angular speed α is set to be positive and the leftward steering angular speed α is set to be negative, the inclination of the solid line or the dotted line illustrated in FIG. 7 increases as the absolute value of the steering angular speed α increases.

When the gain G12 is smaller than 1, the control intervention threshold value T1 of the entry section TR1, which is the threshold value of the collision margin time for determining the control intervention by the ADAS, is reduced as in the above Expression (1), and the control intervention by the ADAS is suppressed. As described above, in the entry section TR1 of the turning course TR, when the predicted collision lateral position CLL with respect to the vehicle width center position of the vehicle 100 is in the direction opposite to the direction of the steering angular speed α which is the time change rate of the steering angle θ, the control intervention adjustment unit F4 reduces the control intervention threshold value T1 of the entry section TR1 to suppress the control intervention by the ADAS.

Figure 8:
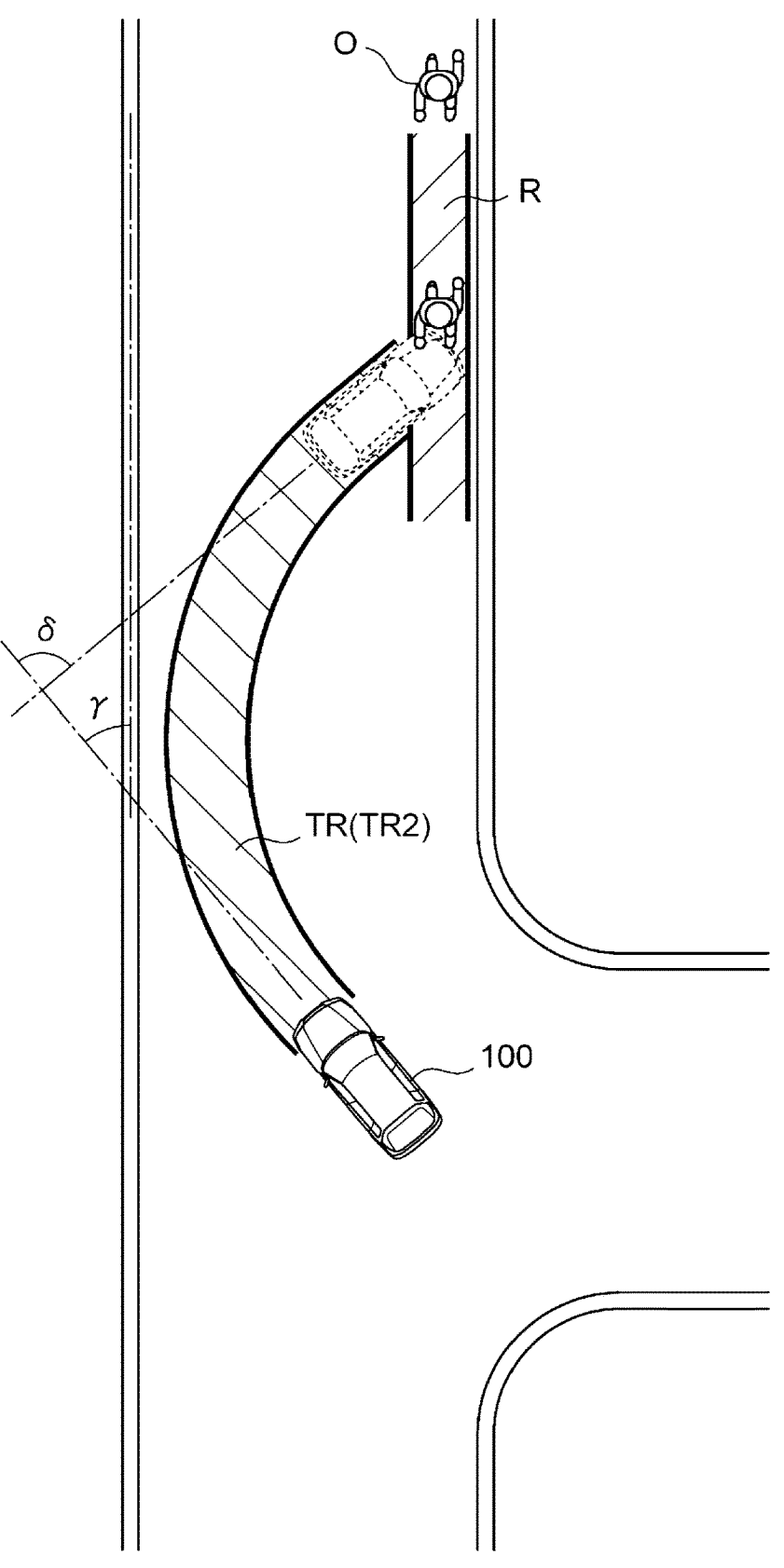
FIG. 8 is a plan view illustrating a state in which the vehicle in FIG. 1 is traveling in a turning section of a turning course when turning right.

Then, the vehicle control device 110 executes a process P44 of determining whether or not the vehicle is traveling in the turning section TR2 illustrated in FIG. 5. FIG. 8 is a plan view illustrating a state in which the vehicle 100 is traveling in the turning section TR2 of the turning course TR at the time of turning right. The turning section TR2 is, for example, a section next to the entry section TR1 at the early stage of the turning course TR illustrated in FIG. 4, and is a section at the middle stage of the turning course TR in which the steering angular speed α becomes substantially zero when the driver maintains the predetermined steering angle θ.

As described above, the course prediction unit F1 predicts the turning course TR when the vehicle 100 turns left or right, as the steady circular turning course, based on the steering angle θ detected by the steering angle sensor 132 of the vehicle 100. In the process P44, the course prediction unit F1 calculates, for example, a collision prediction yaw angle δ and a turning end yaw angle γ illustrated in FIG. 8. The course prediction unit F1 determines that the vehicle 100 is traveling in the turning section TR2 of the turning course TR (YES) when the collision prediction yaw angle δ is larger than the turning end yaw angle γ.

Here, the collision prediction yaw angle δ illustrated in FIG. 8 is, for example, an angle formed by the current front-rear axis of the vehicle 100 and the front-rear axis of the vehicle 100 at the predicted position of the vehicle 100 at a time point when the collision margin time with respect to the target O has elapsed. In addition, the turning end yaw angle γ illustrated in FIG. 8 is, for example, an angle formed by the current front-rear axis of the vehicle 100 and the road edge of a road after the turning end, which is acquired from the image capturing device 121 or the like.

Note that the method for determining the turning section TR2 by the course prediction unit F1 is not limited to the above method. For example, when the steering angular speed α is within a predetermined range that can be regarded as substantially 0, the course prediction unit F1 may determine that the vehicle 100 is traveling in the turning section TR2 of the turning course TR (YES).

In the process P44, when determining that the vehicle 100 is not traveling in the turning section TR2 (NO), for example, the course prediction unit F1 executes a process P46 (described later) of determining whether or not the vehicle 100 is traveling in the exit section TR3. On the other hand, when the course prediction unit F1 determines in the process P44 that the vehicle 100 is traveling in the turning section TR2 (YES), the vehicle 100 executes a process P45 of adjusting a control intervention threshold value T2 in the turning section TR2.

Figure 9:
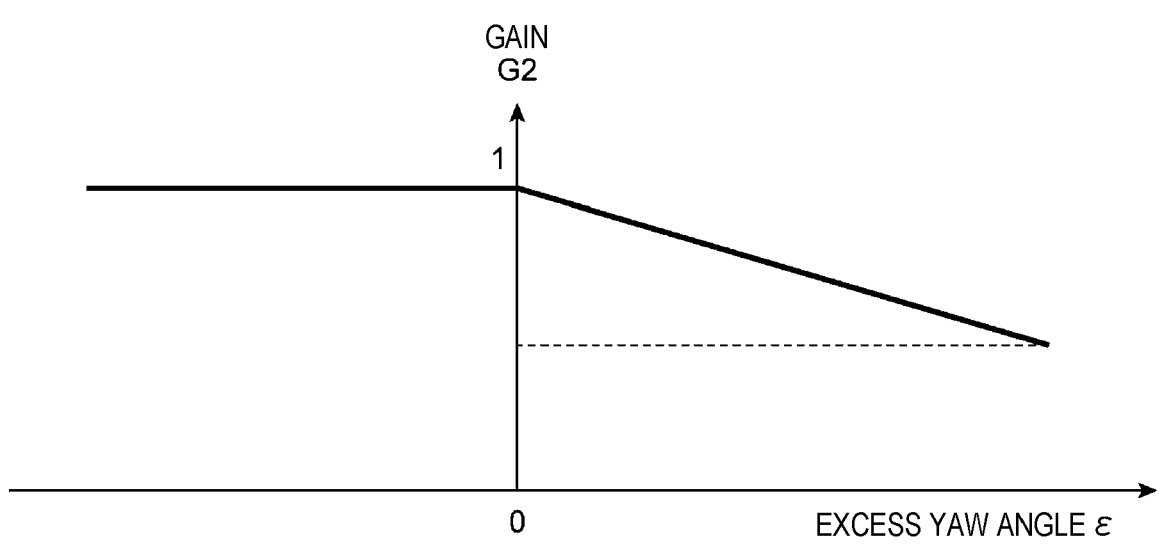
FIG. 9 is an example of the correction table used for adjusting the control intervention threshold value in the turning section in FIG. 5.

FIG. 9 is a graph illustrating an example of a correction table CT2 used in the process P45 of adjusting the control intervention threshold value T2 in the turning section TR2. In the present embodiment, the control intervention adjustment unit F4 of the vehicle control device 110 has, for example, the correction table CT2 in which a gain G2 for reducing the control intervention threshold value T2 in the turning section TR2 of the turning course TR is defined. The correction table CT2 is stored in the memory 111 of the vehicle control device 110, for example.

The correction table CT2 of the turning section TR2 includes, for example, an excess yaw angle gain table CT21 illustrated in FIG. 9. The excess yaw angle gain table CT21 is a graph in which the excess yaw angle ε is set on the horizontal axis and the gain G2 is set on the vertical axis. Here, for example, in the turning section TR2 illustrated in FIG. 8, the control intervention adjustment unit F4 calculates a collision prediction yaw angle δ which is an angle formed by the current front-rear axis of the vehicle 100 and the front-rear axis after the lapse of the collision margin time.

In addition, the control intervention adjustment unit F4 calculates a turning end yaw angle γ which is an angle formed by the current front-rear axis of the vehicle 100 and the front-rear axis when the vehicle 100 passes through the exit section TR3. Further, the control intervention adjustment unit F4 calculates an excess yaw angle ε which is a difference (δ−γ) between the collision prediction yaw angle δ and the turning end yaw angle γ. The control intervention adjustment unit F4 calculates the gain G2 based on the calculated excess yaw angle ε and the excess yaw angle gain table CT21 illustrated in FIG. 9, and calculates the control intervention threshold value T2 of the turning section TR2 by the following Expression (2).

$$T2 = G2 \times T0 \qquad (2)$$

In the above Expression (2), T0 is the control intervention threshold value T0 set based on the speed V of the vehicle 100 in the above-described process P41. As illustrated in FIG. 9, in the excess yaw angle gain table CT21 of the turning section TR2, the gain G2 decreases as the excess yaw angle ε increases when the excess yaw angle ε is positive. More specifically, in the excess yaw angle gain table CT21 of the turning section TR2, the gain G2 is 1 when the excess yaw angle ε is 0 degrees or less, and the gain G2 gradually decreases from 1 to 0 as the excess yaw angle ε increases when the excess yaw angle ε is larger than 0 degrees.

When the gain G2 is smaller than 1, the control intervention threshold value T2 of the turning section TR2, which is the threshold value of the collision margin time for determining the control intervention by the ADAS, is reduced as in the above Expression (2), and the control intervention by the ADAS is suppressed. That is, in the turning section TR2 of the turning course TR, the control intervention adjustment unit F4 reduces the control intervention threshold value T2 of the turning section TR2 as the excess yaw angle ε increases. In this manner, the control intervention adjustment unit F4 suppresses the control intervention by the ADAS.

Figure 10:
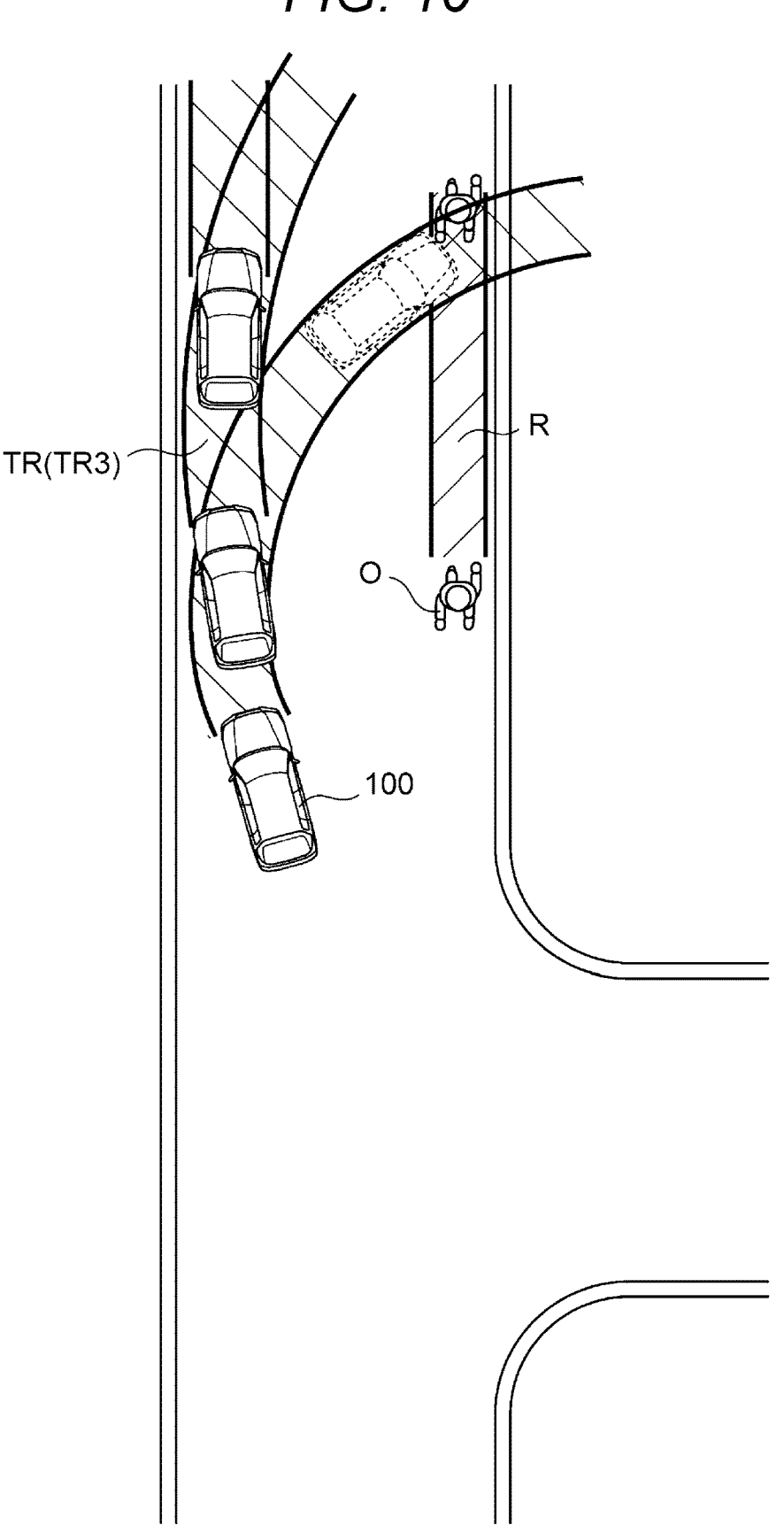
FIG. 10 is a plan view illustrating a state in which the vehicle in FIG. 1 is traveling in an exit section of the turning course when turning right.

Then, the vehicle control device 110 executes a process P46 of determining whether or not the vehicle is traveling in the exit section TR3 illustrated in FIG. 5. FIG. 10 is a plan view illustrating a state in which the vehicle 100 is traveling in the exit section TR3 of the turning course TR at the time of turning right. The exit section TR3 is, for example, a section next to the turning section TR2 at the middle stage of the turning course TR illustrated in FIG. 8, and is a section at the end stage of the turning course TR in which the direction of the steering angular speed α is opposite to the turning direction of the vehicle 100 when the driver intends to bring the steering angle θ back to 0 degrees.

In the process P46, the course prediction unit F1 determines that the vehicle 100 is traveling through the exit section TR3 (YES), for example, when the turning end yaw angle γ, which is an angle formed by the current front-rear axis of the vehicle 100 and the road edge of the road after the turning end, is equal to or smaller than a predetermined angle. In addition, for example, when the steering angular speed α is equal to or greater than a predetermined value in the direction opposite to the turning direction of the vehicle 100, the course prediction unit F1 determines that the vehicle 100 is traveling in the exit section TR3 (YES).

Further, for example, when the turning end yaw angle Y and the steering angle θ become substantially 0 and the vehicle 100 is traveling straight, the course prediction unit F1 determines that the vehicle 100 has passed through the exit section TR3 and the traveling in the turning course TR has ended. In addition, the course prediction unit F1 may determine the passage through the exit section TR3 and the end of the turning course TR at the time of turning right or left, by using the HD map or the GNSS.

In the process P46, when determining that the vehicle 100 is not traveling in the exit section TR3 (NO), for example, the course prediction unit F1 executes a process P48 (described later) of selecting one of the control intervention threshold values T1 and T2. On the other hand, when the course prediction unit F1 determines in the process P46 that the vehicle 100 is traveling in the exit section TR3 (YES), the vehicle 100 executes a process P47 of adjusting a control intervention threshold value T3 in the exit section TR3.

Figure 11:
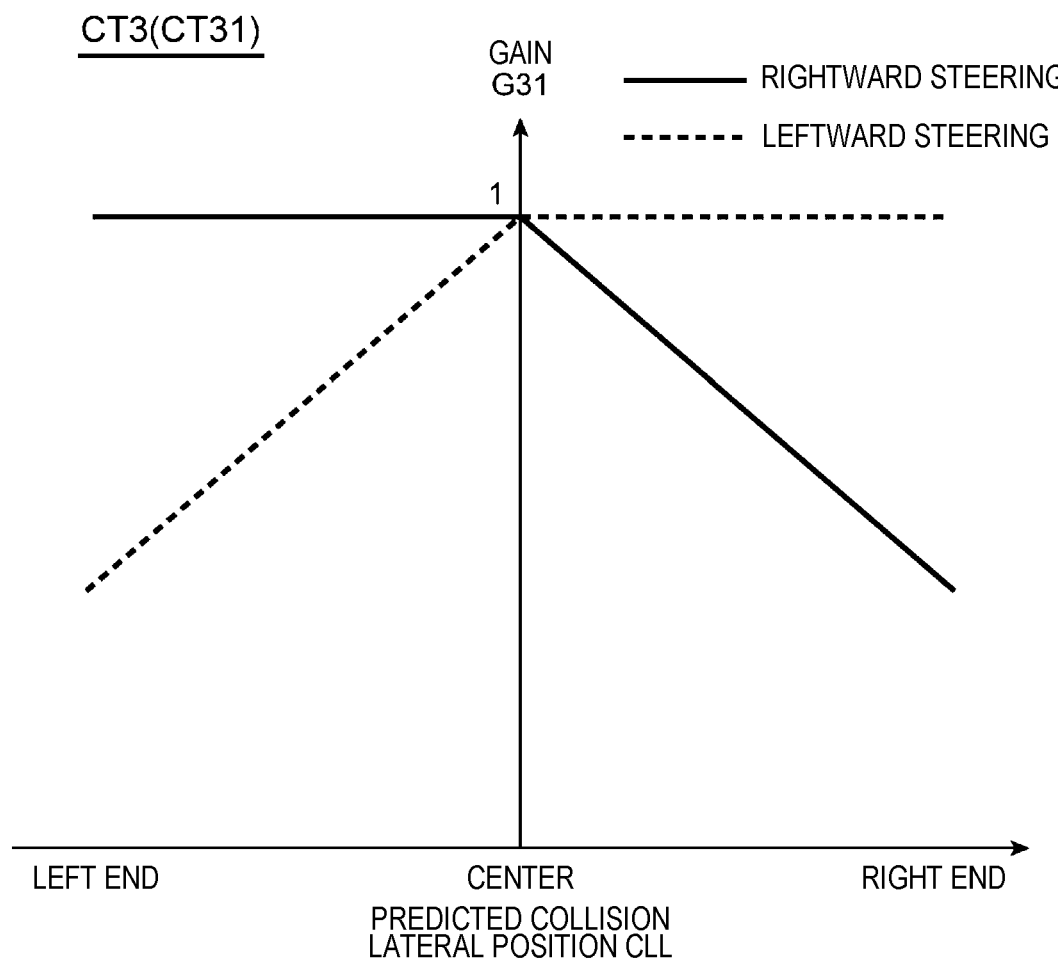
FIG. 11 is an example of a correction table used for adjusting the control intervention threshold value in the exit section in FIG. 5.
Figure 12:
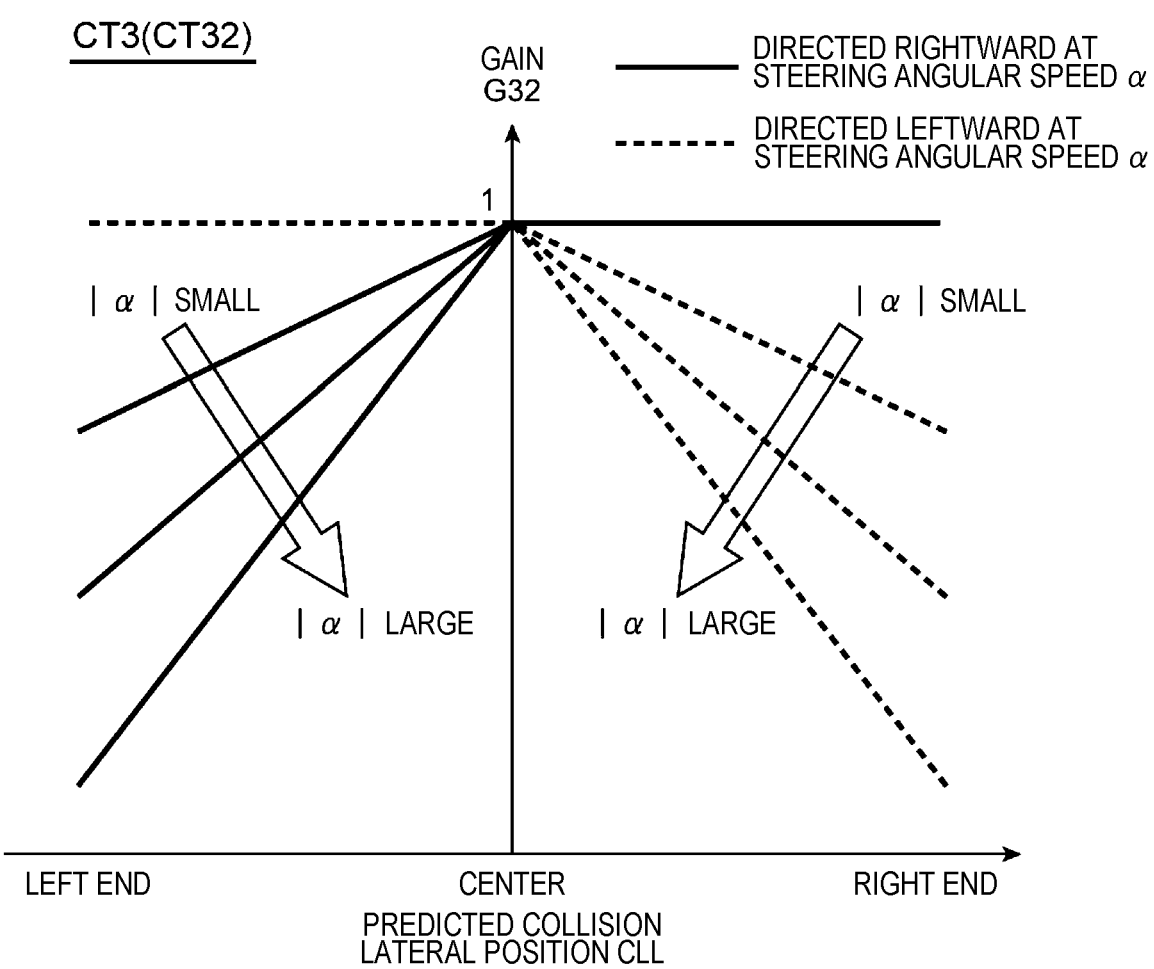
FIG. 12 is another example of the correction table used for adjusting the control intervention threshold value in the exit section in FIG. 5.

FIGS. 11 and 12 are graphs illustrating examples of a correction table CT3 used in the process P46 of adjusting the control intervention threshold value T3 in the exit section TR3. In the present embodiment, the control intervention adjustment unit F4 of the vehicle control device 110 has, for example, the correction table CT3 in which gains G31 and G32 for reducing the control intervention threshold value T3 in the exit section TR3 of the turning course TR are defined. The correction table CT3 is stored in the memory 111 of the vehicle control device 110, for example.

The correction table CT3 of the exit section TR3 includes, for example, a steering direction gain table CT31 illustrated in FIG. 11 and a steering angular speed gain table CT32 illustrated in FIG. 12. Each of the steering direction gain table CT31 and the steering angular speed gain table CT32 is a graph in which the predicted collision lateral position CLL is set on the horizontal axis and the gains G31 and G32 are set on the vertical axis. Here, the predicted collision lateral position CLL is a collision prediction position of the target O with respect to the front end of the vehicle 100, and is a collision prediction position of the target O in the vehicle width direction of the vehicle 100.

In the process P47 illustrated in FIG. 5, the control intervention adjustment unit F4 calculates the control intervention threshold value T3 of the exit section TR3 by the following Expression (3), for example. In Expression (3), G31 and G32 are the gains G31 and G32 determined based on the steering direction gain table CT31 in FIG. 11 and the steering angular speed gain table CT32 in FIG. 12, respectively. T0 is a control intervention threshold value T0 set based on the speed V of the vehicle 100 in the above-described process P41.

$$T3=G31\times G32\times T0 \tag{3}$$

As illustrated in FIG. 11, in the steering direction gain table CT31 of the exit section TR3, the gain is 1 when the predicted collision lateral position CLL is on the opposite side of the steering direction of the vehicle 100 with respect to the vehicle width center position of the vehicle 100. For example, as indicated by the solid line in FIG. 11, the gain G31 is 1 when the steering direction of the vehicle 100 based on the steering angle θ detected by the steering angle sensor 132 rightward (rightward steering), and the predicted collision lateral position CLL is at the center of the vehicle 100 in the vehicle width direction or on the left side of the center.

In addition, in the steering direction gain table CT31 of the exit section TR3 illustrated in FIG. 11, the gain G31 decreases as the predicted collision lateral position CLL moves away from the vehicle width center position of the vehicle 100 in the steering direction of the vehicle 100. For example, as indicated by the solid line in FIG. 11, when the steering direction of the vehicle 100 is the right direction (rightward steering), the gain G31 gradually decreases from 1 to 0 as the predicted collision lateral position CLL moves away from the center of the vehicle width direction of the vehicle 100 in the right direction.

When the gain G31 is smaller than 1, the control intervention threshold value T3 of the exit section TR3, which is the threshold value of the collision margin time for determining the control intervention by the ADAS, is reduced as in the above Expression (3), and the control intervention by the ADAS is suppressed. That is, in the exit section TR3 in the turning course TR, the control intervention adjustment unit F4 reduces the control intervention threshold value T3 of the exit section TR3 as the predicted collision lateral position CLL of the target O moves away from the center in the vehicle width direction of the vehicle 100 in the steering direction. In this manner, the control intervention adjustment unit F4 suppresses the control intervention by the ADAS.

Further, as illustrated in FIG. 12, in the steering angular speed gain table CT32 of the exit section TR3, the gain G32 is 1 when the predicted collision lateral position CLL is on the same side as the direction of the steering angular speed α with respect to the vehicle width center position of the vehicle 100. For example, as indicated by the solid line in FIG. 12, the gain G32 is 1 when the direction of the steering angular speed α of the vehicle 100 is rightward and the predicted collision lateral position CLL is at the center of the vehicle 100 in the vehicle width direction or on the right side of the center.

In addition, in the steering angular speed gain table CT32 of the exit section TR3 illustrated in FIG. 12, the gain G32 decreases as the predicted collision lateral position CLL moves away from the vehicle width center position of the vehicle 100 in the direction opposite to the direction of the steering angular speed a of the vehicle 100. For example, as indicated by the solid line in FIG. 12, when the steering direction of the steering angular speed a of the vehicle 100 is rightward, the gain G32 gradually decreases from 1 to 0 as the predicted collision lateral position CLL moves away from the center of the vehicle width direction of the vehicle 100 in the left direction.

Furthermore, in the steering angular speed gain table CT32 of the exit section TR3 illustrated in FIG. 12, the change rate of the gain G32 with respect to the predicted collision lateral position CLL increases as the steering angular speed α increases. More specifically, in the steering angular speed gain table CT32, for example, when the rightward steering angular speed α is set to be positive and the leftward steering angular speed α is set to be negative, the inclination of the solid line or the dotted line illustrated in FIG. 12 increases as the absolute value of the steering angular speed α increases.

When the gain G32 is smaller than 1, the control intervention threshold value T3 of the exit section TR3, which is the threshold value of the collision margin time for determining the control intervention by the ADAS, is reduced as in the above Expression (3), and the control intervention by the ADAS is suppressed. As described above, in the exit section TR3 of the turning course TR, when the predicted collision lateral position CLL with respect to the vehicle width center position of the vehicle 100 is in the direction opposite to the direction of the steering angular speed α which is the time change rate of the steering angle θ, the control intervention adjustment unit F4 reduces the control intervention threshold value T1 of the entry section TR1 to suppress the control intervention by the ADAS.

Then, the vehicle control device 110 executes a process P48 of selecting the control intervention threshold values T1, T2, and T3 illustrated in FIG. 5. In the processes P42, P44, and P46 described above, it is assumed that the course prediction unit F1 has determined any one of the entry section TR1, the turning section TR2, and the exit section TR3, as the section in which the vehicle 100 is traveling. In this case, in the process P48, the control intervention adjustment unit F4 selects the control intervention threshold values T1, T2, and T3 in the section determined by the course prediction unit F1, and ends the process P4 illustrated in FIG. 5.

On the other hand, in the processes P42, P44, and P46 described above, it is assumed that the course prediction unit F1 determines two or more sections among the entry section TR1, the turning section TR2, and the exit section TR3, as the sections in which the vehicle 100 is traveling. In this case, in the process P48, the control intervention adjustment unit F4 selects the correction tables CT1, CT2, and CT3 having the smallest control intervention threshold values T1, T2, and T3 from the correction tables CT1, CT2, and CT3 of two or more sections determined by the course prediction unit F1.

More specifically, as illustrated in FIG. 10, at the time of transition from the turning section TR2 to the exit section TR3 in the turning course TR of the vehicle 100, it is not determined in the process P42 described above that the vehicle 100 is traveling in the entry section TR1, but it may be determined in the process P44 and the process P46 described above that the vehicle 100 is traveling in the turning section TR2 and the exit section TR3, respectively. In this case, in the processes P45 and P47 described above, the control intervention threshold value T0 is multiplied by the gains G21 and G22, and the gains G31 and G32, respectively, to calculate the control intervention threshold value T2 of the turning section TR2 and the control intervention threshold value T3 of the exit section TR3.

Figure 13:
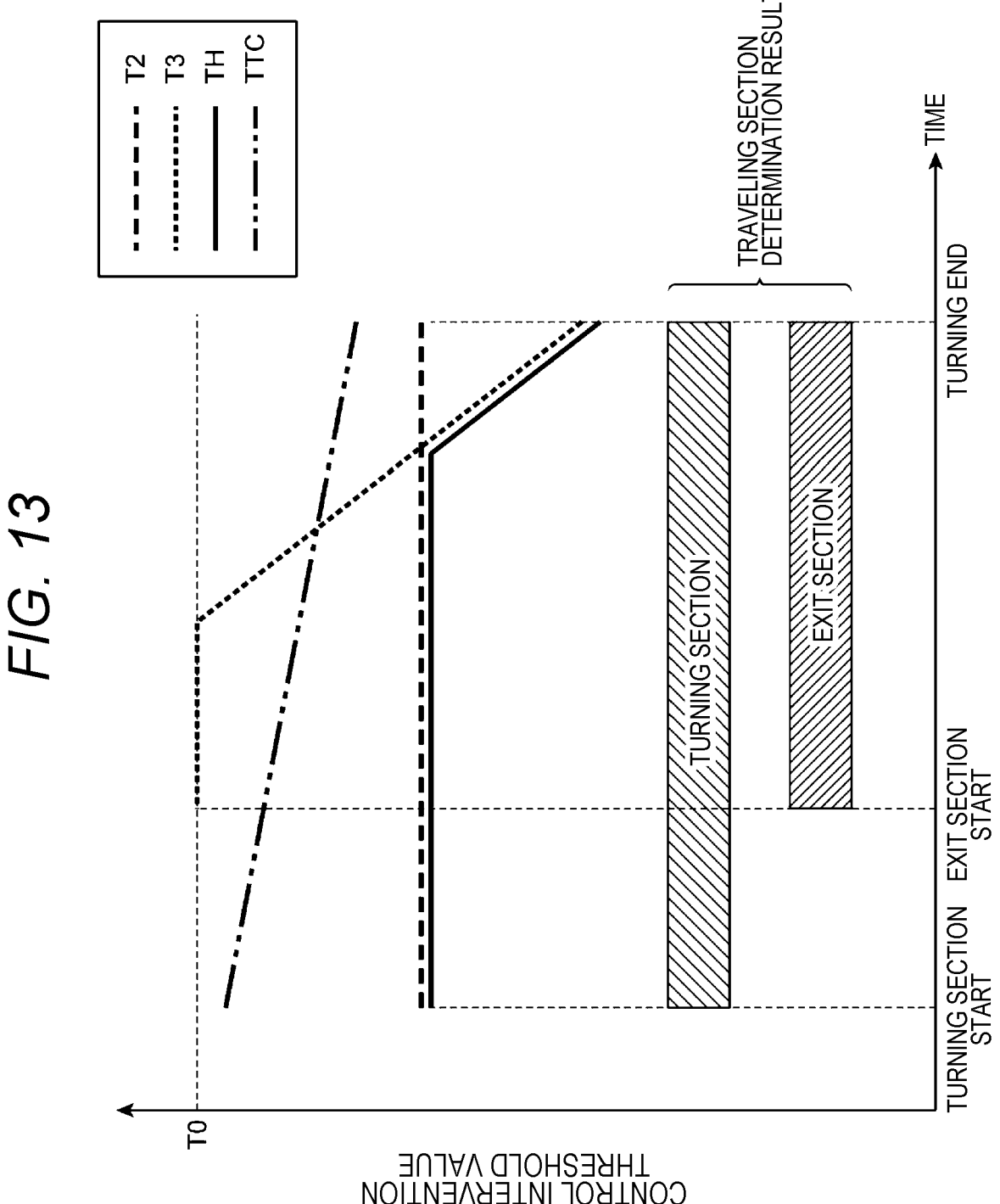
FIG. 13 is a graph illustrating an example of a method for determining the control intervention threshold value used for control intervention of the vehicle.

FIG. 13 is a graph illustrating an example of the method for determining the control intervention threshold value TH used for the control intervention of the vehicle 100 by the ADAS. In the example illustrated in FIG. 13, the collision prediction unit F3 calculates the collision margin time (TTC) with respect to the target O from a time point when the vehicle 100 starts traveling in the turning section TR2 in the turning course TR to turning end at the time of turning right or left, as indicated by a two-dot chain line.

In addition, the course prediction unit F1 determines that the vehicle 100 is traveling in the turning section TR2, from the time point when the vehicle 100 starts traveling in the turning section TR2 to the turning end at the time of turning right or left. Further, the course prediction unit F1 determines that the vehicle 100 is traveling in the exit section TR3 from the start of the exit section TR3 to the turning end at the time of turning right or left.

That is, the course prediction unit F1 determines that the vehicle 100 is traveling in one section of the turning section TR2 until the vehicle 100 starts traveling in the exit section TR3 after starting traveling in the turning section TR2. However, the course prediction unit F1 determines that the vehicle 100 is traveling in two sections of the turning section TR2 and the exit section TR3 from the start of traveling in the exit section TR3 to the turning end at the time of turning right or left.

In this case, as indicated by the broken line in FIG. 13, the control intervention adjustment unit F4 calculates only the control intervention threshold value T2 of the turning section TR2 from when the vehicle 100 starts traveling in the turning section TR2 to when the vehicle 100 starts traveling in the exit section TR3. Therefore, during this period, as indicated by the solid line in FIG. 13, the control intervention adjustment unit F4 selects the control intervention threshold value T2 of the turning section TR2 as the control intervention threshold value TH used for the control intervention of the vehicle 100 by the ADAS.

However, during a period from when the vehicle 100 starts traveling in the exit section TR3 to the turning end at the time of turning right or left, the control intervention adjustment unit F4 calculates the control intervention threshold value T3 of the exit section TR3 as indicated by the dotted line in FIG. 13 in addition to the control intervention threshold value T2 of the turning section TR2. However, for a while after the vehicle 100 starts traveling in the exit section TR3, as illustrated in FIG. 10, it is predicted that the predicted collision lateral position CLL of the target O with respect to the vehicle 100 is the left end opposite to the right direction which is the turning direction when turning right, with respect to the vehicle width center position of the vehicle 100.

In this case, the gain G31 based on the steering direction gain table CT31 and the predicted collision lateral position CLL illustrated in FIG. 11 is 1. In addition, it is assumed that the driver of the vehicle 100 turns the steering wheel to the right for a while after the vehicle 100 starts traveling in the exit section TR3. In this case, the gain G32 is 1 based on the steering angular speed gain table CT32 and the steering angular speed a illustrated in FIG. 12. Therefore, the control intervention threshold value T3 of the exit section TR3 based on the above Expression (3) is the control intervention threshold value T0 set based on the speed V of the vehicle 100, and is longer than the control intervention threshold value T2 of the turning section TR2 until immediately before the turning end at the time of turning right or left.

In this case, the control intervention adjustment unit F4 selects, as the control intervention threshold value TH used for the control intervention of the vehicle 100 by the ADAS, the control intervention threshold value T2 of the shortest turning section TR2 among the control intervention threshold value T2 of the turning section TR2 and the control intervention threshold value T3 of the exit section TR3. Then, when the driver of the vehicle 100 turns the steering wheel back to the left immediately before the end of the exit section TR3 of the turning course TR at the time of turning right, the predicted collision lateral position CLL of the target O with respect to the vehicle 100 moves to the right from the vehicle width center position. Then, the gain G31 based on the steering direction gain table CT31 and the predicted collision lateral position CLL illustrated in FIG. 11 and the gain G32 based on the steering angular speed gain table CT32 and the steering angular speed α illustrated in FIG. 12 are each smaller than 1.

As a result, the control intervention threshold value T3 of the exit section TR3 calculated by Expression (3) is lower than the control intervention threshold value T2 of the turning section TR2. Then, the control intervention adjustment unit F4 selects the control intervention threshold value T3 of the shortest exit section TR3 among the control intervention threshold value T2 of the turning section TR2 and the control intervention threshold value T3 of the exit section TR3, as the control intervention threshold value TH used for the control intervention of the vehicle 100 by the ADAS.

As described above, the course prediction unit F1 may simultaneously determine two or more sections of the entry section TR1, the turning section TR2, and the exit section TR3 while the vehicle 100 is traveling in the turning course TR. In this case, the control intervention adjustment unit F4 selects the correction table having the smallest control intervention threshold values T1, T2, and T3 from the correction tables CT1, CT2, and CT3 of two or more sections. After the process P48 illustrated in FIG. 5 is ended, the vehicle control device 110 ends the process P4 illustrated in FIG. 5 and executes the process P5 of controlling the control target 140 illustrated in FIG. 3.

In the process P5, the vehicle control device 110 performs the collision avoidance control of the vehicle 100 by the vehicle control unit F5 when the collision margin time of the target O with respect to the vehicle 100 is smaller than the control intervention threshold value TH. The collision avoidance control by the vehicle control unit F5 includes, for example, collision warning by at least one of the image display device 141 and the sound output device 142. In addition, the collision avoidance control by the vehicle control unit F5 may include, for example, collision reduction braking (AEB) by the actuator 143.

The control intervention threshold value TH may be different between the case of executing the collision warning and the case of executing the AEB. In this case, the control intervention adjustment unit F4 can separately include the correction tables CT1, CT2, and CT3 for collision warning and the correction tables CT1, CT2, and CT3 for AEB. As a result, the vehicle control unit F5 can execute the collision warning, for example, before executing AEB. Further, the vehicle control unit F5 controls the actuator 143 such that, for example, the deceleration of the vehicle 100 increases as the collision margin time of target O with respect to the vehicle 100 decreases.

As described above, the vehicle control device 110 in the present embodiment is mounted on the vehicle 100, and includes the course prediction unit F1, the collision prediction unit F3, the vehicle control unit F5, and the control intervention adjustment unit F4. The course prediction unit F1 predicts the turning course TR when the vehicle 100 turns left or right, as the steady circular turning course, based on the steering angle θ detected by the steering angle sensor 132 of the vehicle 100. The collision prediction unit F3 calculates the collision margin time between the target O detected by the external environment sensor 120 of the vehicle 100 and the vehicle 100 that travels on the steady circular turning course, and calculates the predicted collision lateral position CLL of the target O with respect to the vehicle width center position of the vehicle 100. The vehicle control unit F5 performs collision avoidance control of a vehicle 100 when the collision margin time is shorter than a control intervention threshold value TH. The control intervention adjustment unit F4 adjusts the control intervention threshold value TH. As illustrated in FIGS. 7 and 12, when the predicted collision lateral position CLL with respect to the vehicle width center position of the vehicle 100 is in the opposite direction to the direction of the steering angular speed α which is the time change rate of the steering angle θ, the control intervention adjustment unit F4 reduces the control intervention threshold values T1 and T2 as in the above Expressions (1) and (3).

With such a configuration, the vehicle control device 110 in the present embodiment can prevent the erroneous operation of the ADAS while ensuring safety. More specifically, for example, as illustrated in FIG. 4 or 10, a collision between the vehicle 100 and the target O may be predicted in the entry section TR1 or the exit section TR3 of the turning course TR when the vehicle 100 turns right or left. Even in such a case, if the predicted collision lateral position CLL of the target O with respect to the vehicle width center position of the vehicle 100 is in the direction opposite to the direction of the steering angular speed α, the traveling direction of the vehicle 100 is changed to the direction of the steering angular speed α thereafter, so that avoidance of the collision with the target O increases. Therefore, the control intervention adjustment unit F4 reduces the control intervention threshold values T1 and T2 when the predicted collision lateral position CLL of the target O with respect to the vehicle width center position of the vehicle 100 is in the direction opposite to the steering angular speed α, as in FIG. 7 and Expression (1) or in FIG. 12 and Expression (3). As a result, when there is a high possibility that the collision with the target O is avoided, it is possible to prevent the erroneous operation of the ADAS by suppressing the collision avoidance control by the vehicle control unit F5, and avoiding unnecessary collision warning and unnecessary AEB. In addition, if the predicted collision lateral position CLL of the target O with respect to the center in the vehicle width direction of the vehicle 100 is in the same direction as the steering angular speed α, the control intervention threshold value T0 is not reduced. Therefore, it is possible to correctly operate the ADAS and to ensure the safety of the vehicle 100 and the target O.

In addition, in the vehicle control device 110 in the present embodiment, while the vehicle 100 is traveling in the turning course TR, the course prediction unit F1 determines the entry section TR1 in which the direction of the steering angular speed α coincides with the steering direction of the vehicle 100, the turning section TR2 in which the steering angular speed α becomes substantially 0, and the exit section TR3 in which the direction of the steering angular speed α is opposite to the steering direction of the vehicle 100. In addition, the control intervention adjustment unit F4 includes the correction tables CT1, CT2, and CT3 in which the gains G11, G12, G2, G31, and G32 for reducing the control intervention threshold values T1, T2, and T3 are defined, for the entry section TR1, the turning section TR2, and the exit section TR3, respectively.

With such a configuration, in each of the entry section TR1, the turning section TR2, and the exit section TR3 of the turning course TR, the vehicle control device 110 in the present embodiment can suppress the erroneous operation of the ADAS due to prediction of the turning course TR as the steady circular turning course based on the steering angle θ. In addition, in each of the entry section TR1, the turning section TR2, and the exit section TR3 of the turning course TR, the vehicle control device 110 can prevent a decrease in safety due to prediction of the turning course TR as the steady circular turning course based on the steering angle θ.

In addition, in the vehicle control device 110 in the present embodiment, the correction table CT1 of the entry section TR1 includes the steering angular speed gain table CT12 as illustrated in FIG. 7. The steering angular speed gain table CT12 is a graph in which the predicted collision lateral position CLL is set on the horizontal axis and the gain G12 is set on the vertical axis. In the steering angular speed gain table CT12, the gain G12 decreases as the predicted collision lateral position CLL moves away from the vehicle width center position of the vehicle 100 in the direction opposite to the direction of the steering angular speed a, and the change rate of the gain G12 with respect to the predicted collision lateral position CLL increases as the steering angular speed α increases.

With such a configuration, as illustrated in FIG. 4, in the entry section TR1 of the turning course TR in which the driver of the vehicle 100 turns the steering wheel more in the steering direction at the time of turning right or left, the vehicle control device 110 in the present embodiment can suppress the erroneous operation of the ADAS while ensuring safety as described above. In addition, in the entry section TR1, as the steering angular speed α becomes higher, the traveling direction of the vehicle 100 changes to the steering direction in a shorter time, and the possibility of collision with the target O is decreased. Therefore, as illustrated in FIG. 7, as the steering angular speed α becomes higher, the change rate of the gain G12 with respect to the predicted collision lateral position CLL is increased to further decrease the gain G12. Thus, it is possible to more reliably suppress the erroneous operation of the ADAS.

In addition, in the vehicle control device 110 in the present embodiment, the correction table CT1 of the entry section TR1 includes the steering direction gain table CT11 as illustrated in FIG. 6. The steering direction gain table CT11 is a graph in which the predicted collision lateral position CLL is set on the horizontal axis and the gain G11 is set on the vertical axis. The gain G11 decreases as the predicted collision lateral position CLL moves away from the vehicle width center position of the vehicle 100 in the direction opposite to the steering direction of the vehicle 100.

With such a configuration, the vehicle control device 110 in the present embodiment can suppress the erroneous operation of the ADAS while ensuring safety, in the entry section TR1 of the turning course TR at the time of turning right or left as illustrated in FIG. 4. Specifically, in the entry section TR1 of the turning course TR, the driver of the vehicle 100 turns the steering wheel more in the steering direction at the time of turning right or left. Therefore, the possibility of collision decreases as the predicted collision lateral position CLL of the target O moves away from the vehicle width center position of the vehicle 100 in the opposite direction to the steering direction of the vehicle 100. Therefore, it is possible to suppress the erroneous operation of the ADAS while ensuring the safety, by decreasing the gain G11 as the predicted collision lateral position CLL of the target O moves away from the vehicle width center position of the vehicle 100 in the direction opposite to the steering direction of the vehicle, and reducing the control intervention threshold value T1 of the entry section TR1, as illustrated in FIG. 6.

In addition, in the vehicle control device 110 in the present embodiment, the control intervention adjustment unit F4 calculates the collision prediction yaw angle δ which is an angle formed by the current front-rear axis of the vehicle 100 and the front-rear axis after the lapse of the collision margin time in the turning section TR2, the turning end yaw angle γ which is an angle formed by the current front-rear axis of the vehicle 100 and the front-rear axis at the time of passing through the exit section TR3, and the excess yaw angle ε obtained by subtracting the turning end yaw angle γ from the collision prediction yaw angle δ. Further, the correction table CT2 of the turning section TR2 includes the excess yaw angle gain table CT21 as illustrated in FIG. 9. The excess yaw angle gain table CT21 is a graph in which the excess yaw angle ε is set on the horizontal axis and the gain G2 is set on the vertical axis. When the excess yaw angle ε is positive, the gain G2 decreases as the excess yaw angle ε increases.

With such a configuration, it is possible to suppress the erroneous operation of the ADAS while ensuring safety in the turning section TR2 of the turning course TR as illustrated in FIG. 8. Specifically, in the turning section TR2 of the turning course TR, even when the collision between the vehicle 100 and the target O is predicted in the steady circular turning course predicted by the course prediction unit F1, the driver turns the steering wheel back in the direction opposite to the turning direction in the subsequent exit section TR3, so that the possibility of the collision is decreased. That is, as the excess yaw angle ε becomes larger, the erroneous operation of the ADAS is more likely to occur. Therefore, in the correction table CT2, by reducing the gain G2 as the excess yaw angle ε increases and reducing the control intervention threshold value T2 of the turning section TR2, it is possible to suppress the erroneous operation of the ADAS while ensuring the safety.

In addition, in the vehicle control device 110 in the present embodiment, the correction table CT3 of the exit section TR3 includes the steering angular speed gain table CT32 as illustrated in FIG. 12. The steering angular speed gain table CT32 is a graph in which the predicted collision lateral position CLL is set on the horizontal axis and the gain G32 is set on the vertical axis. In the steering angular speed gain table CT32, the gain G32 decreases as the predicted collision lateral position CLL moves away from the vehicle width center position of the vehicle 100 in the direction opposite to the direction of the steering angular speed a, and the change rate of the gain G32 with respect to the predicted collision lateral position CLL increases as the steering angular speed α increases.

With such a configuration, as illustrated in FIG. 10, in the exit section TR3 of the turning course TR in which the driver of the vehicle 100 turns the steering wheel back in the direction opposite to the steering direction at the time of turning right or left, the vehicle control device 110 in the present embodiment can suppress the erroneous operation of the ADAS while ensuring safety as described above. In addition, in the exit section TR3, as the steering angular speed α becomes higher, the traveling direction of the vehicle 100 changes to the steering direction in a shorter time, and the possibility of collision with the target O is decreased. Therefore, as illustrated in FIG. 12, as the steering angular speed α becomes higher, the change rate of the gain G32 with respect to the predicted collision lateral position CLL is increased to further decrease the gain G32. Thus, it is possible to more reliably suppress the erroneous operation of the ADAS.

In addition, in the vehicle control device 110 in the present embodiment, the correction table CT3 of the exit section TR3 includes the steering direction gain table CT31 as illustrated in FIG. 11. The steering direction gain table CT31 is a graph in which the predicted collision lateral position CLL is set on the horizontal axis and the gain G31 is set on the vertical axis. The gain G31 decreases as the predicted collision lateral position CLL moves away from the vehicle width center position of the vehicle 100 in the steering direction of the vehicle 100.

With such a configuration, the vehicle control device 110 in the present embodiment can suppress the erroneous operation of the ADAS while ensuring safety, in the exit section TR3 of the turning course TR at the time of turning right or left as illustrated in FIG. 10. Specifically, in the exit section TR3 of the turning course TR, the driver of the vehicle 100 turns the steering wheel back in the direction opposite to the steering direction at the time of turning right or left. Therefore, the possibility of collision decreases as the predicted collision lateral position CLL of the target O moves away from the vehicle width center position of the vehicle 100 in the steering direction. Therefore, it is possible to suppress the erroneous operation of the ADAS while ensuring the safety, by decreasing the gain G31 as the predicted collision lateral position CLL of the target O moves away from the vehicle width center position of the vehicle 100 in the steering direction of the vehicle, and reducing the control intervention threshold value T3 of the exit section TR3, as illustrated in FIG. 11.

In addition, the course prediction unit F1 of the vehicle control device 110 in the present embodiment may simultaneously determine two or more sections among the entry section TR1, the turning section TR2, and the exit section TR3. In this case, the control intervention adjustment unit F4 selects the correction tables CT1, CT2, and CT3 having the smallest control intervention threshold values T1, T2, and T3 from the correction tables CT1, CT2, and CT3 of two or more sections determined by the course prediction unit F1.

With such a configuration, for example, as illustrated in FIG. 13, even when the course prediction unit F1 determines two or more sections, the vehicle control device 110 in the present embodiment can select the control intervention threshold value T2 of the shortest turning section TR2 or the control intervention threshold value T3 of the exit section TR3 as the control intervention threshold value TH of the collision avoidance control by the vehicle control unit F5. As a result, in the vehicle control device 110 in the present embodiment, it is possible to more reliably suppress the erroneous operation of the ADAS while ensuring the safety.

As described above, according to the present embodiment, it is possible to provide the vehicle control device 110 capable of preventing an erroneous operation of an advanced driving assistance system while ensuring safety.

Hitherto, the vehicle control device according to the embodiment of the present disclosure has been described in detail above with reference to the drawings. The specific configuration is not limited to the embodiment and the design changes and the like without departing from the gist of the present disclosure are included in the present disclosure.

REFERENCE SIGNS LIST

100 vehicle
110 vehicle control device
120 external environment sensor
132 steering angle sensor
CLL predicted collision lateral position
CT1 correction table
CT11 steering direction gain table
CT12 steering angular speed gain table
CT2 correction table
CT21 excess yaw angle gain table
CT3 correction table
CT31 steering direction gain table
CT32 steering angular speed gain table
F1 course prediction unit
F3 collision prediction unit
F4 control intervention adjustment unit
F5 vehicle control unit
G11 gain
G12 gain
G2 gain
G31 gain
G32 gain
O target
TH control intervention threshold value
TR turning course
TR1 entry section
TR2 turning section
TR3 exit section
$\alpha$ steering angular speed
$\delta$ collision prediction yaw angle
$\varepsilon$ excess yaw angle
$\gamma$ turning end yaw angle
$\theta$ steering angle

The invention claimed is:

1. A vehicle control device mounted on a vehicle, the vehicle control device comprising:

one or more microcontrollers configured to predict a turning course when the vehicle turns left or right, as a steady circular turning course, based on a steering angle detected by a steering angle sensor of the vehicle;

calculate a collision margin time between a target detected by an external environment sensor of the vehicle and the vehicle that travels on the steady circular turning course, and calculate a predicted collision lateral position of the target with respect to a vehicle width center position of the vehicle;

perform collision avoidance control of the vehicle when the collision margin time is shorter than a control intervention threshold value; and adjust the control intervention threshold value, and reduce the control intervention threshold value when the predicted collision lateral position with respect to the vehicle width center position of the vehicle is in a direction opposite to a direction of a steering angular speed which is a time change rate of the steering angle, wherein the one or more microcontrollers are further configured to determine an entry section, a turning section, and an exit section while the vehicle is traveling on the turning course, the entry section being a section in which the direction of the steering angular speed coincides with a steering direction of the vehicle, the turning section being a section in which the steering angular speed is substantially zero, and the exit section being a section in which the direction of the steering angular speed is opposite to the steering direction of the vehicle, and wherein the one or more microcontrollers are provided with a memory configured to store therein a correction table in which a gain for reducing the control intervention threshold value is defined, for each of the entry section, the turning section, and the exit section.

2. The vehicle control device according to claim 1, wherein a correction table of the entry section includes a steering angular speed gain table, and the steering angular speed gain table is a graph in which the predicted collision lateral position is set on a horizontal axis, the gain is set on a vertical axis, the gain decreases as the predicted collision lateral position moves away from the vehicle width center position of the vehicle in the direction opposite to the direction of the steering angular speed, and a change rate of the gain with respect to the predicted collision lateral position increases as the steering angular speed increases.

3. The vehicle control device according to claim 1, wherein a correction table of the entry section includes a steering direction gain table, and the steering direction gain table is a graph in which the predicted collision lateral position is set on a horizontal axis, the gain is set on a vertical axis, the gain decreases as the predicted collision lateral position moves away from the vehicle width center position of the vehicle in the direction opposite to the steering direction of the vehicle.

4. The vehicle control device according to claim 1, wherein the one or more microcontrollers are further configured to calculate a collision prediction yaw angle, a turning end yaw angle, and an excess yaw angle in the turning section, the collision prediction yaw angle being an angle formed by a current front-rear axis of the vehicle and a front-rear axis after a lapse of the collision margin time, the turning end yaw angle being an angle formed by the current front-rear axis of the vehicle and a front-rear axis when the vehicle passes through the exit section, and the excess yaw angle obtained by subtracting the turning end yaw angle from the collision prediction yaw angle, the correction table of the turning section includes an excess yaw angle gain table, and the excess yaw angle gain table is a graph in which the excess yaw angle is set on a horizontal axis and the gain is set on a vertical axis, and the gain decreases as the excess yaw angle increases when the excess yaw angle is positive.

5. The vehicle control device according to claim 1, wherein a correction table of the exit section includes a steering angular speed gain table, and the steering angular speed gain table is a graph in which the predicted collision lateral position is set on a horizontal axis, the gain is set on a vertical axis, the gain decreases as the predicted collision lateral position moves away from the vehicle width center position of the vehicle in the direction opposite to the direction of the steering angular speed, and a change rate of the gain with respect to the predicted collision lateral position increases as the steering angular speed increases.

6. The vehicle control device according to claim 1, wherein a correction table of the exit section includes a steering direction gain table, and the steering direction gain table is a graph in which the predicted collision lateral position is set on a horizontal axis, the gain is set on a vertical axis, the gain decreases as the predicted collision lateral position moves away from the vehicle width center position of the vehicle in the steering direction of the vehicle.

7. The vehicle control device according to claim 1, wherein the one or more microcontrollers are configured to select, upon simultaneous determination of two or more sections of the entry section, the turning section, and the exit section, the correction table having the smallest control intervention threshold value among the correction tables of the two or more sections.

*  *  *  *  *